US011785507B2

(12) United States Patent
 Lei (10) Patent No.: US 11,785,507 B2
(45) Date of Patent: Oct. 10, 2023

(54) METHOD AND APPARATUS FOR DATA TRANSMISSION

(71) Applicant: TENCENT TECHNOLOGY (SHENZHEN) COMPANY LIMITED, Guangdong (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/589,530

(22) Filed: Jan. 31, 2022

(65) Prior Publication Data

US 2022/0159516 A1    May 19, 2022

Related U.S. Application Data

(63) Continuation of application No. 16/692,530, filed on Nov. 22, 2019, now Pat. No. 11,277,772.
(Continued)

(51) Int. Cl.
*H04W 28/24* (2009.01)
*H04W 48/20* (2009.01)
(Continued)

(52) U.S. Cl.
CPC ........... *H04W 28/24* (2013.01); *H04W 4/029* (2018.02); *H04W 28/0268* (2013.01);
(Continued)

(58) Field of Classification Search
CPC . H04W 28/0268; H04W 28/24; H04W 4/029; H04W 4/40; H04W 40/20;
(Continued)

(56) References Cited

U.S. PATENT DOCUMENTS 10,594,484 B2 * 3/2020 Rodriguez ............ H04L 9/0861
10,820,348 B2   10/2020 Khoryaev
(Continued)

FOREIGN PATENT DOCUMENTS

CN      108024199 A    5/2018
JP    2017175296 A    9/2017
(Continued)

OTHER PUBLICATIONS

CATT, "Solution for Key Issue: 3GPP PC5 RAT selection for a V2X application," SA WG2 Meeting #122bis, S2-175753, Aug. 21-25, 2017, Retrieved from the Internet: <URL:https://www.3gpp.org/ftp/tsg_sa/WG2_Arch/TSGS2_122BIS_Sophia_Antipolis/Docs/S2-175753.zip,> 5 pages.
(Continued)

*Primary Examiner* — Joseph Arevalo
(74) *Attorney, Agent, or Firm* — ARENTFOX SCHIFF LLP (57) ABSTRACT

An aspect of the disclosure provides a user equipment (UE) that includes processing circuitry. The processing circuitry of the UE determines whether to transmit service data associated with a service to a receiving device through a primary link or a sidelink. When the service data is determined to be transmitted through the sidelink, the processing circuitry selects a radio access technology (RAT) for implementing the sidelink from a plurality of available RATs according to a set of configuration parameters received from a network, determines communication parameters for the selected RAT based on quality of service (QoS) or service requirement related parameters included in the set of configuration parameters, and transmits the service data through the sidelink implemented by the selected RAT according to the communication parameters. When the service data is determined to be transmitted through the primary link, the
(Continued)

processing circuitry transmits the service data through the primary link.

20 Claims, 5 Drawing Sheets

Related U.S. Application Data (60) Provisional application No. 62/773,163, filed on Nov. 29, 2018.

(51) Int. Cl.
*H04W 80/12* (2009.01)
*H04W 4/029* (2018.01)
*H04W 28/02* (2009.01)
*H04W 92/18* (2009.01)

(52) U.S. Cl.
CPC ........... *H04W 48/20* (2013.01); *H04W 80/12* (2013.01); *H04W 92/18* (2013.01)

(58) Field of Classification Search
CPC ... H04W 40/246; H04W 48/18; H04W 48/20; H04W 76/14; H04W 80/12; H04W 88/06; H04W 92/18
USPC ........................................ 370/329, 259, 390
See application file for complete search history.

(56) References Cited

U.S. PATENT DOCUMENTS

| | | | |
|---|---|---|---|
| 11,032,766 B2* | 6/2021 | Murali | H04W 52/0219 |
| 2009/0068969 A1 | 3/2009 | Lindoff et al. | |
| 2013/0090961 A1* | 4/2013 | Smith | G06Q 40/00 705/7.11 |
| 2014/0067702 A1* | 3/2014 | Rathod | G06Q 50/01 705/319 |
| 2014/0129942 A1* | 5/2014 | Rathod | H04N 21/44226 715/720 |
| 2014/0148152 A1 | 5/2014 | Periyalwar et al. | |
| 2015/0003243 A1 | 1/2015 | Klingenbrunn et al. | |
| 2015/0373635 A1 | 12/2015 | Wang | |
| 2018/0084565 A1 | 3/2018 | Pang et al. | |
| 2019/0174344 A1 | 6/2019 | Karella | |
| 2019/0174547 A1 | 6/2019 | Khoryaev | |
| 2019/0364492 A1* | 11/2019 | Azizi | H04W 48/16 |
| 2020/0076875 A1 | 3/2020 | Sabella | |
| 2020/0162587 A1* | 5/2020 | Martinez | H04W 4/80 |
| 2020/0178124 A1 | 6/2020 | Lei | |
| 2020/0252838 A1 | 8/2020 | Akdeniz | |
| 2020/0280827 A1 | 9/2020 | Fechtel | |
| 2021/0014763 A1 | 1/2021 | Venugopal | |
| 2021/0014791 A1 | 1/2021 | Freda | |
| 2021/0058888 A1 | 2/2021 | Choi | |
| 2021/0153176 A1* | 5/2021 | Lee | H04W 4/40 |
| 2022/0159516 A1* | 5/2022 | Lei | H04W 40/246 |
| 2022/0225156 A1* | 7/2022 | Lee | H04W 28/02 |

FOREIGN PATENT DOCUMENTS

| | | | |
|---|---|---|---|
| WO | WO 2016/159845 A1 | 10/2016 | |
| WO | 2018071094 A1 | 4/2018 | |
| WO | WO 2018/182591 A1 | 10/2018 | |

OTHER PUBLICATIONS

Huawei, HiSilicon, InterDigital Inc., Lenovo, Motorola Mobility, "Discussion on V2X Architecture and Wayforward," SA WG2 Meeting #129, S2-1810780, Oct. 15-19, 2018, Retrieved from the Internet: <URL: https://www.3gpp.org/ftp/sg_sa/WG2_Arch/TSGS2_129_Dongguan/Docs/S2-1810780.zip,> 6 pages.

LG Electronics, Samsung, "Conclusion on KI #2," SA WG2 Meeting #129bis, S2-1811964, Nov. 26-30, 2018, Retrieved from the Internet: <URL: https://www.3gpp.org/ftp/tsg_sa/WG2_Arch/TSGS2_129BIS_West_Palm_Beach/Docs/S2-1811964.zip,> 6 pages.

Office Action in JP2021522053, dated May 24, 2022, with English Translation 32 pages.

International Search Report and Written Opinion dated Feb. 6, 2020 in PCT/US19/63043.

LG Electronics Inc: "PC5 RAT selection", 3GPP Draft; R2-1815426 PC5 RAT Selection, $3^{rd}$ Generation Partnership Project (3GPP), Mobile Competence Centre ; 650, Route Des Lucioles F-06921 Sophia-Antipolis Cedex; France vol. RAN WG2, No. Chengdu, China; Oct. 8-12, 2008.

Extended European Search Report dated Nov. 18, 2021 in Application No. 19890116.7.

* cited by examiner

METHOD AND APPARATUS FOR DATA TRANSMISSION

INCORPORATION BY REFERENCE

This application is a Continuation of U.S. patent application Ser. No. 16/692,530, filed Nov. 22, 2019, which claims the benefit of priority to U.S. Provisional Application No. 62/773,163, "Method and Apparatus for RAT and Interface Selection for Service Data Delivery in Coexisted 4G and 5G Systems" filed on Nov. 29, 2018, wherein the entire content and disclosure of each of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless communication systems can provide various telecommunication services such as telephony, video, data, messaging, and broadcasts. With continuous developments of wireless communication technologies, multiple radio access technologies (RATs) that adopt different telecommunication standards may co-exist. For example, new radio (NR), which is also referred to as fifth generation (5G), is a new RAT beyond Long Term Evolution (LTE) which is also referred to as fourth generation (4G). In some applications, different radio access technology (i.e., different RATs) may coexist.

SUMMARY

Aspects of the disclosure provide methods, apparatuses, and systems for data transmission. In some embodiments, a user equipment (UE) includes processing circuitry. The processing circuitry of the UE determines whether to transmit service data associated with a service to a receiving device through a primary link (e.g. downlink & uplink for cellular system like 4G and 5G which is used for establishing communication between UE and base stations) or a sidelink. When the service data is determined to be transmitted through the sidelink, the processing circuitry selects a radio access technology (RAT) for implementing the sidelink from a plurality of available RATs according to a set of configuration parameters received from a network, determines communication parameters for the selected RAT based on quality of service (QoS) or service requirement related parameters included in the set of configuration parameters, and transmits the service data through the sidelink implemented by the selected RAT according to the communication parameters. When the service data is determined to be transmitted through the primary link, the processing circuitry transmits the service data through the primary link.

In some embodiments, the set of configuration parameters includes spectrum segmentations of the plurality of available RATs for implementing the sidelink, the spectrum segmentations being specified in association with an area that is identifiable according to a geographical location of the UE or according to a network entity that provides the primary link. In some embodiments, the set of configuration parameters includes user subscription information, user membership information, and service agreement information with one or more networks for the primary link.

In some embodiments, when the service data is determined to be transmitted through the sidelink, the processing circuitry of the UE sends, by an application layer implemented by the processing circuitry of the UE, a service requirement of the service data according to the QoS or service requirement related parameters to an adaptation layer implemented by the processing circuitry of the UE; selects, by the application layer implemented by the processing circuitry of the UE, the RAT for implementing the sidelink according to the set of configuration parameters; and determines, by the adaptation layer implemented by the processing circuitry of the UE, the communication parameters for the selected RAT based on the service requirement. In some embodiments, the service requirement is not RAT-specific.

In some embodiments, when the service data is determined to be transmitted through the sidelink, the processing circuitry of the UE sends, by an application layer implemented by the processing circuitry of the UE, a plurality of RAT-specific service requirements of the service data for the plurality of available RATs according to the QoS or service requirement related parameters to an adaptation layer implemented by the processing circuitry of the UE; selects, by the adaptation layer implemented by the processing circuitry of the UE, the RAT for implementing the sidelink according to the set of configuration parameters; and determines, by the adaptation layer implemented by the processing circuitry of the UE, the communication parameters for the selected RAT based on one of the RAT-specific service requirements for the selected RAT.

In some embodiments, the QoS or service requirement related parameters correspond to at least one of jitter, throughput, packet loss rate, availability of licensed or unlicensed spectrum, cost information, or whether an intelligent transportation system (ITS) spectrum is used.

In some embodiments, the processing circuitry of the UE receives the set of configuration parameters from a network side device in response to a request from the UE. In some embodiments, the processing circuitry of the UE receives the set of configuration parameters from a network side device without a request from the UE.

In some embodiments, the plurality of available RATs includes at least two of a first RAT corresponding to a Long Term Evolution (LTE) standard, a second RAT corresponding to a fifth generation New Radio (5G NR) standard, and a third RAT corresponding to a Dedicated Short Range Communications (DSRC) standard.

Aspects of the disclosure provide methods of data transmission. In some embodiments, processing circuitry of a user equipment (UE) determines whether to transmit service data associated with a service to a receiving device through a primary link or a sidelink. When the service data is determined to be transmitted through the sidelink, the processing circuitry of the UE selects a radio access technology (RAT) for implementing the sidelink from a plurality of available RATs according to a set of configuration parameters received from a network, determines communication parameters for the selected RAT based on quality of service (QoS) or service requirement related parameters included in the set of configuration parameters, and transmits the service data through the sidelink implemented by the selected RAT according to the communication parameters. When the service data is determined to be transmitted through the primary link, the processing circuitry of the UE transmits the service data through the primary link.

Aspects of the disclosure also provide a non-transitory computer-readable medium storing instructions which when executed by a computer cause the computer to perform any one or a combination of the methods for data transmission.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide a RAT and interface selection mechanism for service data delivery that can enable coexistence of different RATs, for example sidelinks implemented according to different RATs, to support a vehicle-to-everything (V2X) communication service in a common spectrum band. In some embodiments, a set of configuration parameters can be provided to a user equipment (UE) such that mutual interruption between different RATs can be avoided. Further, the mechanism according to this disclosure can enable the mapping of service requirements that are not RAT-specific, such as quality of service (QoS) parameters, to communication parameters for a selected RAT, such that a common application layer can be configured to support sidelinks according to different RATs.

Figure 1:
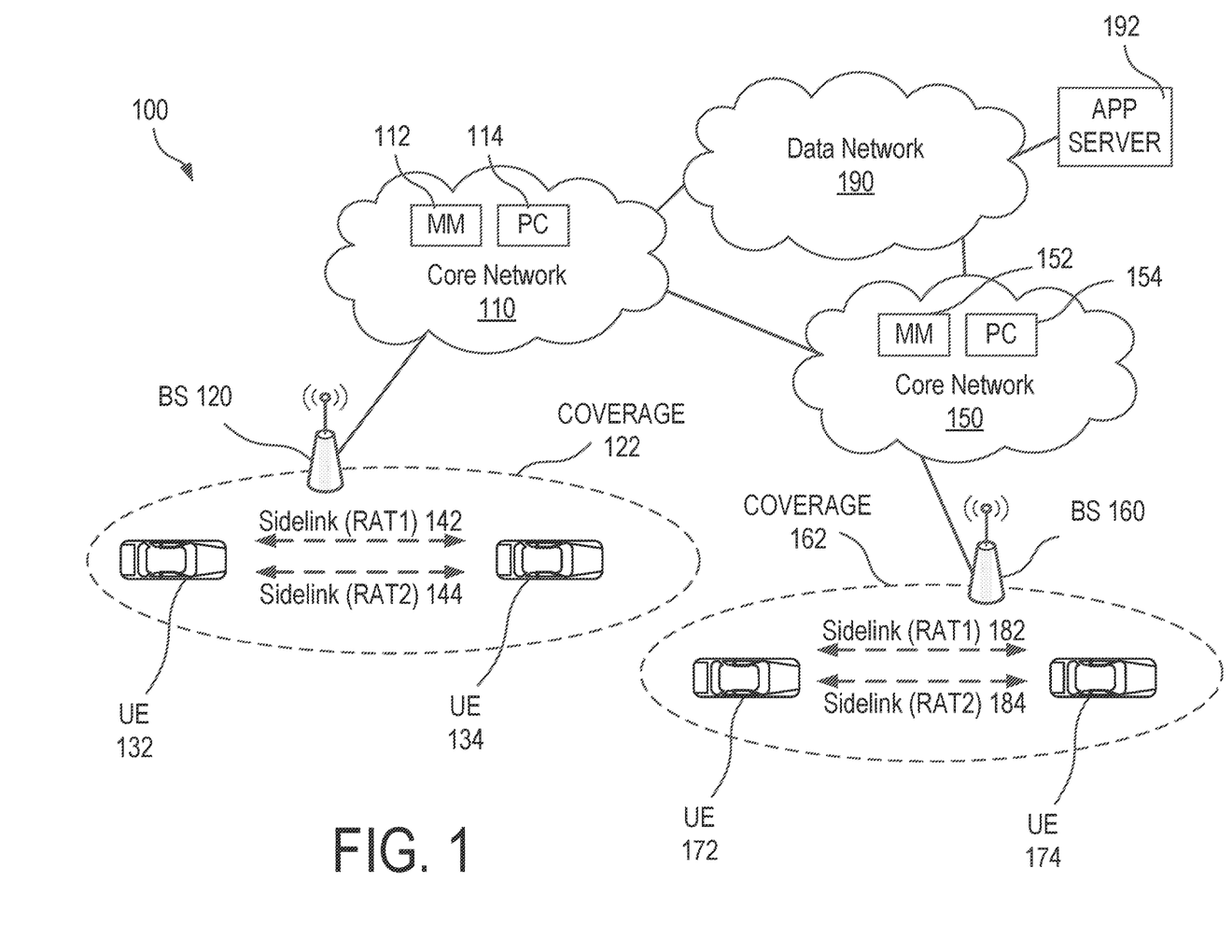
FIG. 1 shows a diagram of a communication system according to some embodiments of the disclosure.

FIG. 1 shows a diagram of a communication system (100) according to some embodiments of the disclosure. The communication system (100) includes a first wireless core network (110) configured to provide services according to a first RAT (RAT1), a second wireless core network (150) configured to provide services according to a second RAT (RAT2), and a data network (190) communicatively connected to one another. In some embodiments, the first wireless core network (110), the second wireless core network (150), and the data network (190) are suitably connected, for example by the Internet and the like, to enable control signals and/or data communication among the networks.

The communication system (100) further includes a first base station (120) communicatively connected to the first wireless core network (110) and configured to provide services according to the first RAT (RAT1), and a second base station (160) communicatively connected to the second wireless core network (150) and configured to provide services according to the second RAT (RAT2). Moreover, the first base station (120) corresponds to a first wireless communication coverage area (122), in which a first UE (132) and a second UE (134) are capable of establishing communication with the first wireless core network (110) via the first base station (120) according to the first RAT (RAT1). Also, the second base station (160) corresponds to a second wireless communication coverage area (162), in which a third UE (172) and a fourth UE (174) are capable of establishing communication with the second wireless core network (150) via the second base station (160) according to the second RAT (RAT2).

In this example, the UEs (132, 134, 172, 174) are capable of establishing communication with base stations (also referred to as "primary links" in this disclosure) according to the first RAT (RAT1) and the second RAT (RAT2). Also, the UEs (132, 134, 172, 174) are capable of establishing communication with another UE (also referred to as "sidelinks" in this disclosure) according to the first RAT (RAT1) and/or the second RAT (RAT2). For example, the first UE (132) and the second UE (134) can establish a sidelink (142) therebetween according to the first RAT (RAT1) or a sidelink (144) therebetween according to the second RAT (RAT2). In another example, the third UE (172) and the fourth UE (174) can establish a sidelink (182) therebetween according to the first RAT (RAT1) or a sidelink (184) therebetween according to the second RAT (RAT2). The two RATs (RAT1 and RAT2) are used as a non-limiting example. One or more other RATS may be utilized in other embodiments.

In some embodiments, the first RAT (RAT1) and the second RAT (RAT2) may be selected from a group of RATs that conform to standards including a Long-Term Evolution (LTE) standard, a Fifth Generation New Radio (5G NR) standard, Institute of Electrical and Electronics Engineers (IEEE) 802.11 family of standards, other suitable wireless communication standards, and/or variations thereof. In some examples, the UEs can establish sidelinks or primary (e.g. uplink/downlink) links according to more than two RATs. The first RAT (RAT1) and the second RAT (RAT2) can be same or different RAT types such as NR Uu, NR PCS, LTE Uu, and LTE PC5, etc. Meanwhile, any of the aforementioned RAT types may be regularly updated, so there can be different releases of the RATs. Different releases of one RAT are also considered as the aforementioned RATs in this disclosure.

The first wireless core network (110) can include a mobility management network element (MM, 112) and a policy control network element (PC, 114). A network element in this application can refer to a specific network function performed by one or more devices, or a specific network entity (e.g., a network device) configured to perform the specific network function. The MM (112) can be configured to control the signaling related to mobility and security for accessing the first wireless core network (110). The PC (114) can be configured to provide control information regarding network slicing, roaming, and/or mobility management. Exemplary control information can include configuration parameters for implementing a sidelink.

When the first wireless core network (110) is configured to provide services according to a first RAT (RAT1) that corresponds to the 5G NR standard, the first wireless core network (110) can be referred to as a 5G Core Network (5GC), and the base station (120) can be referred to as a next generation Node-B (gNB). The first wireless core network (110), one or more base stations (e.g., 120), and one or more UEs (e.g., 132, 134) form a 5G network. In such an example, the MM (112) can also be referred to as a core access and mobility management function (AMF), and the PC (114) can also be referred to as a policy control function (PCF). In some examples, the UEs (132, 134) are also capable of establishing wireless communication with the second wireless core network (150).

The second wireless core network (150) can include network elements such as an MM (152) and a PC (154). The MM (152) can be configured to control the signaling related to mobility and security for accessing the second wireless core network (150). The PC (154) can be configured to provide control information regarding network slicing, roaming, and/or mobility management. Exemplary control information can include configuration parameters or implementing a sidelink.

When the second wireless core network (150) is configured to provide services according to a second RAT (RAT2) that corresponds to the LTE standard, the second wireless core network (150) can be referred to as an Evolved Packet Core (EPC), and the base station (160) can be referred to as an evolved Node-B (eNB), where the second wireless core network (150), one or more base stations (e.g., 160), and one or more UEs (e.g., 172, 174) form a 4G network. In such an example, the MM (152) can also be referred to as a LTE mobility management entity (LTE MME), and the PC (154) can also be referred to as a V2X Control Function (V2X-CF). In some examples, the UEs (172, 174) are also capable of establishing wireless communication with the first wireless core network (110).

The UEs (132, 134, 172, 174) are depicted as vehicles in FIG. 1 as a non-limiting example. One or more of the UEs (132, 134, 172, 174) can be any suitable fixed devices or mobile devices, and may be referred to using other suitable terminology, such as mobile stations, user terminals, wireless devices, and the like. Moreover, in some examples, one or more of the UEs (132, 134, 172, 174) can be respectively mounted to one or more vehicles. Accordingly, in this disclosure, data transmission from a particular UE to another UE or an entity in a network infrastructure can be referred to as a vehicle-to-everything (V2X) communication.

The data network (190) is connected with an application server (192). The application server (192) can provide a V2X application. The application server (192) controls an operation of the V2X application by at least receiving, transmitting, and processing various messages to and from one or more UEs or one or more other application servers. As depicted in FIG. 1, the application server (192) is connected to the data network (190). The application server (192) can be implemented as a single computer device or a plurality of computer devices positioned in the data network (190), the first wireless core network (110), and/or the second wireless core network (150). In some embodiments, multiple application servers are included in the communication system (100), and the application servers can be deployed outside or inside the data network (190), the first wireless core network (110), and/or the second wireless core network (150).

In an example, each network element in the communication system (100) can be implemented by one or more circuits (e.g., processing circuitry, memory circuitry, input/output circuitry, and the like), a processor that operates based on software instructions, or a combination thereof. In another example, a network element can be implemented as a computational device or with computational devices. The computational devices can be disposed at the same location or can be distributed at different locations and are connected to work together as, and to appear as, a single computational device. In another example, multiple network elements can be implemented by one physical device.

In the following description, as non-limiting examples, the first RAT (RAT1) corresponds to the 5G NR standard, and the second RAT (RAT2) corresponds to the LTE standard.

When a V2X service is to be provisioned for a UE (e.g., 132, 134, 172, or 174), the UE can generate, at a communication processing layer such as an application layer, service data to be transmitted. The UE also determines whether the service data is to be transmitted using a primary link (such as communication between the UE and a base station, e.g., a "Uu reference point" or a "radio interface") or a sidelink (such as communication between the UE and another UE, e.g., a "PC5 reference point" or a "PC5 interface"). In some embodiments, in a case that Uu is not available due to limited radio resources or lack of applicable base stations, only PC5 can be utilized. In some embodiments, in a case that both Uu and PC5 are available, the UE can select, at the application layer for example, whether to transmit the service data using Uu or PC5 according to control information received from a network side device or entity.

The control information can be provided to the UE from the network side, such as from the application server (192) or an entity that implements an application function, and/or the PC (114 or 154) of the first wireless core network (110) or the second wireless core network (150). The control information can include a set of configuration parameters. In one embodiment, the application server (192), the application function, and/or the PC (114 or 154) provides the set of configuration parameters according to factors including a geographical location of the UE (or a geographical location of the vehicle on which the UE is mounted), user subscription or membership information, or a service agreement applicable to the UE with the operator of the corresponding wireless communication network, such as the 5G network and/or the 4G network as described above.

Transmission of the set of configuration parameters can be initiated by a request from the UE, or initiated (e.g., pushed) by a network side entity without the request from the UE. The set of configuration parameters can include information indicating one or more of the following elements: (1) allowed RAT (e.g. NR PC5 or LTE PC5) for a whole spectrum in a current area; and (2) allowed RAT (e.g. NR PC5 or LTE PC5) for a segmented spectrum in the current area. An example of spectrum segmentation is illustrated in FIG. 2.

In some embodiments, the control information may include, for example, quality of service (QoS) or other service requirement related parameters, such as latency, jitter, throughput, packet loss rate, availability of licensed or unlicensed spectrum, corresponding cost/charging information, and/or whether an intelligent transportation system (ITS) spectrum is used. In some embodiments, the availability of licensed or unlicensed spectrum is a factor related to a QoS level, because the likelihood of having a quickly deteriorating interference level may depend upon whether a particular sidelink is using the licensed or unlicensed spectrum. For example, when the ITS spectrum, which is an unlicensed spectrum in some examples, is used, the interference may increase as the density of UEs (or vehicles with UEs mounted thereon) increases. As such, the QoS level when using the ITS spectrum may worsen more quickly than using a licensed spectrum.

In some embodiments, a UE that is communicatively connected to the first wireless core network (110, such as a 5GC) can obtain configuration parameters from the PC (114, such as a PCF). A UE that is communicatively connected to the second wireless core network (150, such as an EPC) can obtain configuration parameters from the PC (154, such as a V2X-CF). A UE can obtain configuration parameters from the application server (192) when the UE is communicatively connected to the data network (190), for example when the UE is not connected to the first or second wireless core network (110 and 150). In at least one embodiment, a UE can obtain configuration parameters from the application server (192) via a storage medium, such as an optical disc or a thumb drive.

Figure 2:
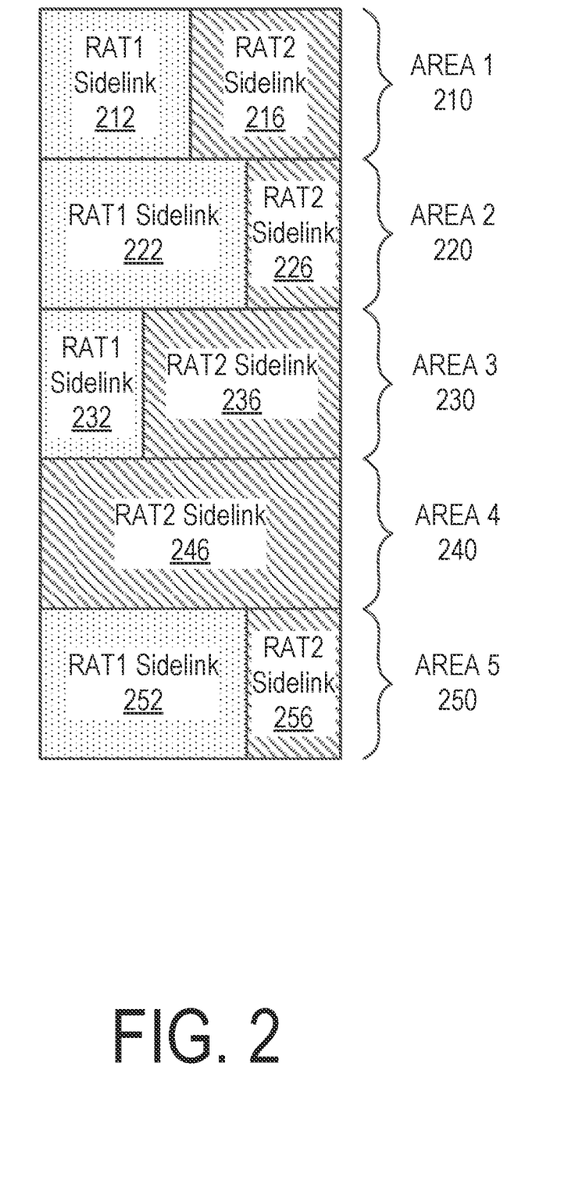
FIG. 2 shows a spectrum allocation diagram that specifies spectrum allocation for a user equipment according to some embodiments of the disclosure.

FIG. 2 shows a spectrum allocation diagram that specifies spectrum segmentation for different RATs according to some embodiments of the disclosure. The spectrum segmentation can be recorded in association with one or more areas identifiable according to a geographical location of the UE or other location information. The other location information can be related to a network (e.g., PLMN) that is currently serving the UE with a primary link, such as location, tracking area, or macro cell information related to the PLMN.

As shown in FIG. 2, for area 1 (210), area 2 (220), area 3 (230), area 4 (240), and area 5 (250), the spectrum segmentation for implementing sidelinks according to the first RAT (RAT1) and the second RAT (RAT2) can be configured to use different portions of a same assigned spectrum for these areas (210, 220, 230, 240, 250).

For example, in area 1 (210), UEs are allowed to implement sidelinks according to the first RAT (RAT1) using spectrum resources within a first portion (212) of the spectrum, and allowed to implement sidelinks according to the second RAT (RAT2) using spectrum resources within a second portion (216) of the spectrum. In area 2 (220), UEs are allowed to implement sidelinks according to the first RAT (RAT1) using spectrum resources within a third portion (222) of the spectrum, and allowed to implement sidelinks according to the second RAT (RAT2) using spectrum resources within a fourth portion (226) of the spectrum. In area 3 (230), UEs are allowed to implement sidelinks according to the first RAT (RAT1) using spectrum resources within a fifth portion (232) of the spectrum, and allowed to implement sidelinks according to the second RAT (RAT2) using spectrum resources within a sixth portion (236) of the spectrum. In area 4 (240), UEs are not allowed to implement sidelinks according to the first RAT (RAT1), and only allowed to implement sidelinks according to the second RAT (RAT2) using spectrum resources within the entire portion (246) of the spectrum. Also, in area 5 (250), UEs are allowed to implement sidelinks according to the first RAT (RAT1) using spectrum resources within a seventh portion (252) of the spectrum, and to implement sidelinks according to the second RAT (RAT2) using spectrum resources within a eighth portion (256) of the spectrum.

FIG. 2 merely illustrates an exemplary spectrum segmentation for implementing sidelinks. While two RATs (e.g., RAT1 and RAT2) are depicted as a non-limiting example, the spectrum can be segmented into additional portion for implementing sidelinks according to three or more RATs in other embodiments.

Figure 3A:
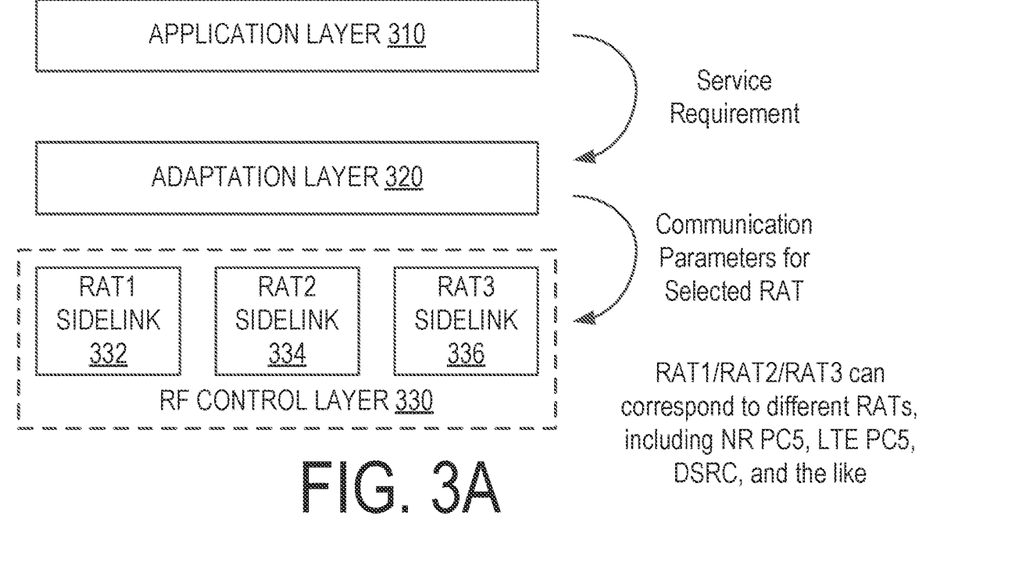
FIGS. 3A and 3B show diagrams of various processing layers for performing a communication task according to different RATs according to some embodiments of the disclosure.

FIG. 3A shows a diagram of various processing layers for performing a communication task according to different RATs according to some embodiments of the disclosure. In some embodiments, a communication task can be performed by various layers of the processing layers implemented by a UE (e.g., 132, 134, 172, or 174).

The processing layers implemented by the UE can include at least an application layer (310), an adaptation layer (320), and a radio frequency (RF) control layer (330). The RF control layer (330) may further include a first control module for controlling RAT1 Sidelink (332), a second control module for controlling RAT2 Sidelink (334), and a third control module for controlling RAT3 Sidelink (336). The various processing layers can be implemented by processing circuitry of the UE. The first, second, and third control modules can be implemented by processing circuitry that controls communication circuitry of the UE or can be implemented by the communication circuitry of the UE.

When the service data is determined to be transmitted through a sidelink, the application layer (310) can send service requirement information of the service data according to the QoS or service requirement related parameters to the adaptation layer (320). In some embodiments, the service requirement information of the service data is not RAT-specific. For example, the application layer (310) may be aware of coexisting RATs but unaware of the detailed RAT-specific parameters (e.g., parameters for radio and/or circuitry settings). The application layer (31) can provide a service requirement of the service data, such as a QoS requirement, to the adaptation layer (320). The adaptation layer (320) can determine communication parameters for the selected RAT based on the service requirement. For example, the adaptation layer (320) can perform inter-layer mapping to translate the service requirement that is not RAT-specific to radio parameters for the selected RAT. Finally, the adaptation layer (320) can forward the communication parameters to the corresponding RAT control module in the RF control layer (330) for implementing the sidelink according to the selected RAT.

In some embodiments, RAT1 corresponds to LTE, RAT2 corresponds to 5G NR, and RAT3 corresponds to a Dedicated Short Range Communications (DSRC) using the Institute of Electrical and Electronics Engineers (IEEE) 802.11p. The communication circuitry can include a DSRC radio, E-UTRA PC5 radio, and NR PC5 radio. In some embodiments, the UE can only support two different RATs or can support more than three different RATs. The disclosed mechanism is also applicable to one or more other RATs. Therefore, in some examples, the RF control layer (330) may include more or less than three RF control modules as depicted in FIG. 3A. In some embodiments, RAT1, RAT2, and RAT3 can correspond to same or different RAT types such as NR PC5, E-UTRA PC5, DSRC, and the like. Meanwhile, any of the aforementioned RAT types may be regularly updated, so there can be different releases of the RATs. Different releases of one RAT are also considered as the aforementioned RATs in this disclosure.

Figure 3B:
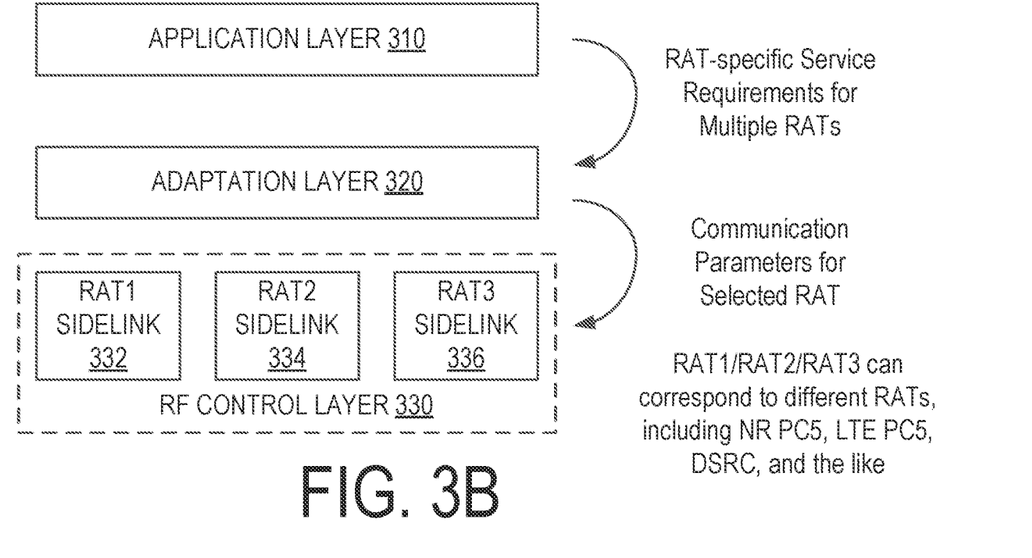

FIG. 3B shows a diagram of various processing layers for performing a communication task according to different RATs according to some embodiments of the disclosure. The components depicted in FIG. 3B that are the same or similar to those in FIG. 3A are given the same reference numbers.

In one embodiment, when the service data is determined to be transmitted through a sidelink, the application layer (310) can send a plurality of RAT-specific service requirements of the service data for the plurality of RATs according to the QoS or service requirement related parameters to the adaptation layer (320). The RAT-specific service requirements may be provided with information identifying the respective RATs (e.g., RAT identifiers). In other embodiments, the adaptation layer (320) determines which requirements are relevant to the respective RATs and determine communication parameters for the selected RAT based on one of the RAT-specific service requirements for the selected RAT. In some examples, the RAT-specific service requirements for the different RATs may share one or more common parameters.

For example, the application layer (310) may be aware of coexisting RATs but unaware of which RAT is to be used to implement the sidelink. In this case, the application layer (310) can provide multiple service requirements of the service data, such as QoS requirements, for all or a subset of available RATs to the adaptation layer (320). The adaptation layer (320) can select the RAT for implementing the sidelink according to the service requirement for the respective RAT, such as a set of configuration parameters. The adaptation layer (320) can determine communication parameters for the selected RAT based on one of the RAT-specific service requirements for the selected RAT. For example, the adaptation layer (320) can perform inter-layer mapping to translate the RAT-specific service requirement to radio parameters for the selected RAT. Finally, the adaptation layer (320) can forward the communication parameters to the corresponding RAT control module in the RF control layer (330) for implementing the sidelink according to the selected RAT.

In one embodiment, when the service data is determined to be transmitted through a sidelink, the application layer (310) may know which RAT is to be used to implement the sidelink. In this case, the application layer (310) can send a RAT-specific service requirement of the service data for the selected RAT to the adaptation layer (320). The RAT-specific service requirement may be provided with information identifying the selected RAT (e.g., a RAT identifier). In other embodiments, one or more parameters of the RAT-specific service requirement can be used to identify the selected RAT. The adaptation layer (320) can determine communication parameters for the selected RAT based on the RAT-specific service requirement for the selected RAT. The selected RAT may be identified by a RAT identifier associated with the RAT-specific service requirement. Finally, the adaptation layer (320) can forward the RAT-specific parameters to the corresponding RAT control module in the RF control layer (330) for implementing the sidelink according to the selected RAT.

Figure 4:
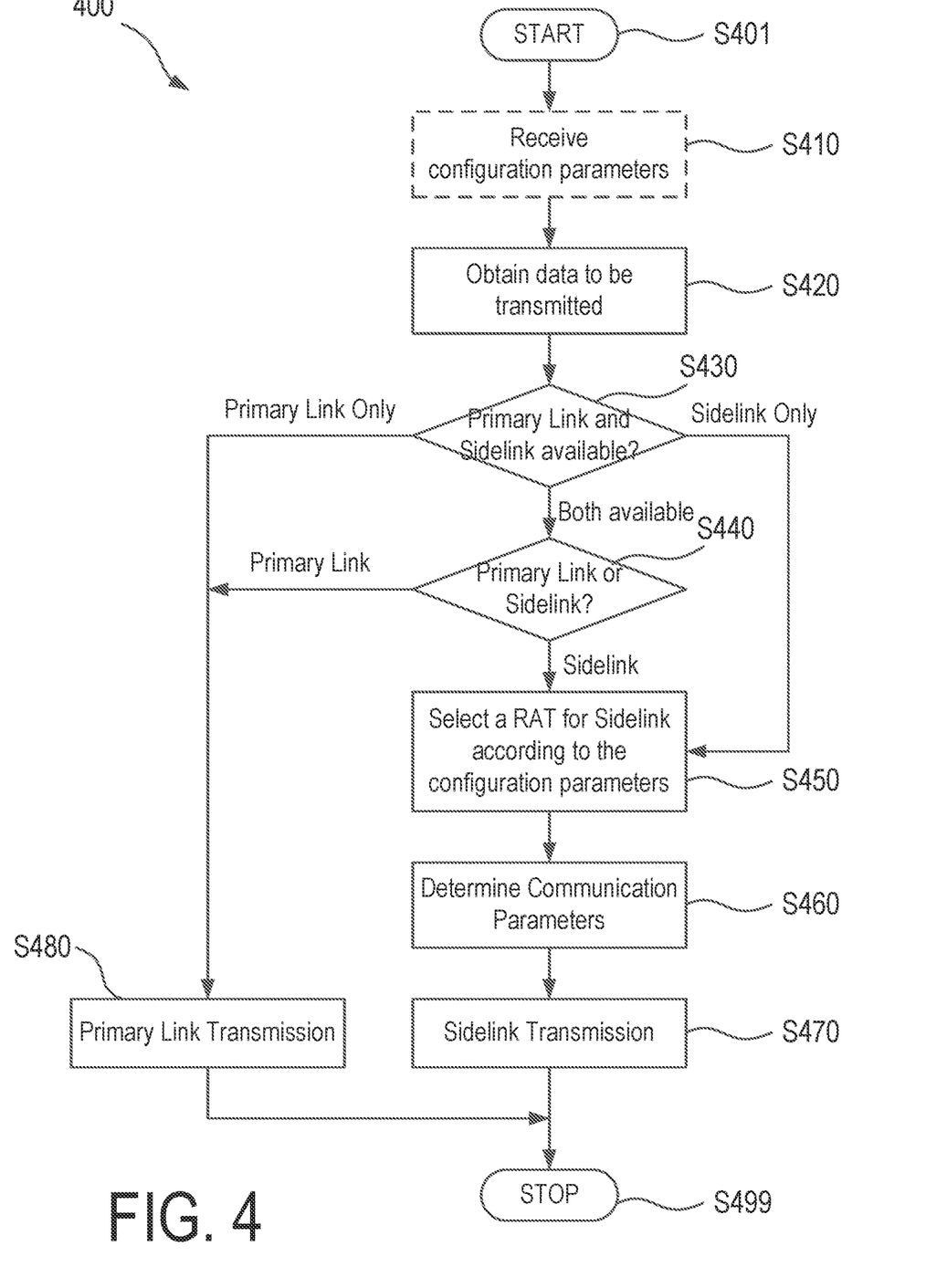
FIG. 4 shows a flow chart outlining a process of data communication according to some embodiments of the disclosure.

FIG. 4 shows a flow chart outlining a process (400) of data communication according to some embodiments of the disclosure. In some embodiments, the process (400) is executed by a UE (e.g., 132, 134, 172, or 174). In some examples, the process (400) is executed by circuitry, such as processing circuitry, transceiver circuitry, and the like. In some examples, one or more processors execute software instructions stored in one or more non-transitory computer-readable storage mediums (e.g., one or more memories) to execute the process 400. The process starts at (S401) and proceeds to (S410).

At (S410), the UE receives a set of configuration parameters. In some embodiments, the UE is capable of establishing primary links with one or more base stations according to at least one of a first RAT (RAT1) and/or a second RAT (RAT2). Also, the UE is capable of establishing sidelinks with another UE according to the first RAT (RAT1) and/or the second RAT (RAT2). In some embodiments, the first RAT (RAT1) and the second RAT (RAT2) may be selected from a group of standards that include a LTE standard, a 5G NR standard, IEEE 802.11 family of standards, other suitable wireless communication standards, and variations thereof.

As described with reference to FIG. 1, the set of configuration parameters can be provided to the UE from an external source, such as the network side. In one embodiment, the application server (192), the application function, and/or the PC (114 or 154) provide the set of configuration parameters according to factors including a geographical location of the UE (or the vehicle on which the UE is mounted), user subscription or membership information, or a service agreement applicable to the UE with the operator of the corresponding wireless communication network, such as the 5G network and/or the 4G network as described above.

In some embodiments, transmission of the set of configuration parameters can be initiated by a request from the UE, or initiated by a network side device without the request from the UE. In some embodiments, (S410) can be performed immediately before (S420), or well before (S420) as long as the set of configuration parameters remains valid at the time (S420) is performed.

At (S420), the UE obtains service data to be transmitted to another UE or an application server. In some embodiments, the service data corresponds to a V2X service. In some embodiments, the UE can generate, at a communication processing layer such as an application layer, the service data to be transmitted.

At (S430), the UE determines whether both a primary link and a sidelink are available options for the UE to transmit the service data. If the UE determines that both the primary link and the sidelink are available for transmitting the service data, the process proceeds to (S440). Otherwise, the process proceeds to (S480). In some embodiments, (S430) is performed by the application layer (e.g., an application) implemented by the UE.

At (S440), after determining that both the primary link and the sidelink are available for transmitting the service data, the UE further determines whether to transmit the service data through the primary link or the sidelink. In some embodiments, (S440) is performed according to a network configuration of the UE, a network configuration of a wireless core network that currently serves the UE, and/or, the set of configuration parameters.

At (S440), if the UE determines that the service data is to be transmitted through a primary link, the process proceeds to (S480). However, if the UE determines that the service data is to be transmitted through a sidelink, the process proceeds to (S450). In some embodiments, (S440) is also performed by the application layer implemented by the UE.

At (S450), the UE selects a RAT for implementing the sidelink according to the set of configuration parameters. In some embodiments, the set of configuration parameters includes information regarding whether one or more of available RATs is allowed to implement the sidelink in a current area. In some embodiments, the set of configuration parameters includes information regarding spectrum segmentation for implementing sidelinks using various RATs. In some embodiments, the set of configuration parameters may include quality of service (QoS) or service requirement related parameters, such as latency, jitter, throughput, packet loss rate, availability of licensed or unlicensed spectrum, and/or corresponding cost/charging information.

In some embodiments, (S450) can be performed by the application layer implemented by the UE or a lower communication processing layer such as an adaptation layer as shown in FIGS. 3A and 3B.

At (S460), the UE can determine communication parameter for the selected RAT based on quality of service (QoS) or service requirement related parameters included in the set of configuration parameters. In some embodiments, (S460) can be performed by the adaptation layer implemented by the UE as described with reference to FIGS. 3A and 3B.

At (S470), the UE can transmit the service data through a sidelink according to an RAT selected at (S450) according to the communication parameters determined at (S460). In some embodiments, (S470) can be performed by the application layer implemented by the UE or the adaptation layer as shown in FIGS. 3A and 3B for example.

At (S480), the UE can transmit the service data through a primary link according an RAT that is available to the UE for establishing the primary link.

After (S470) and (S480), the process proceeds to (S499) and terminates.

Figure 5:
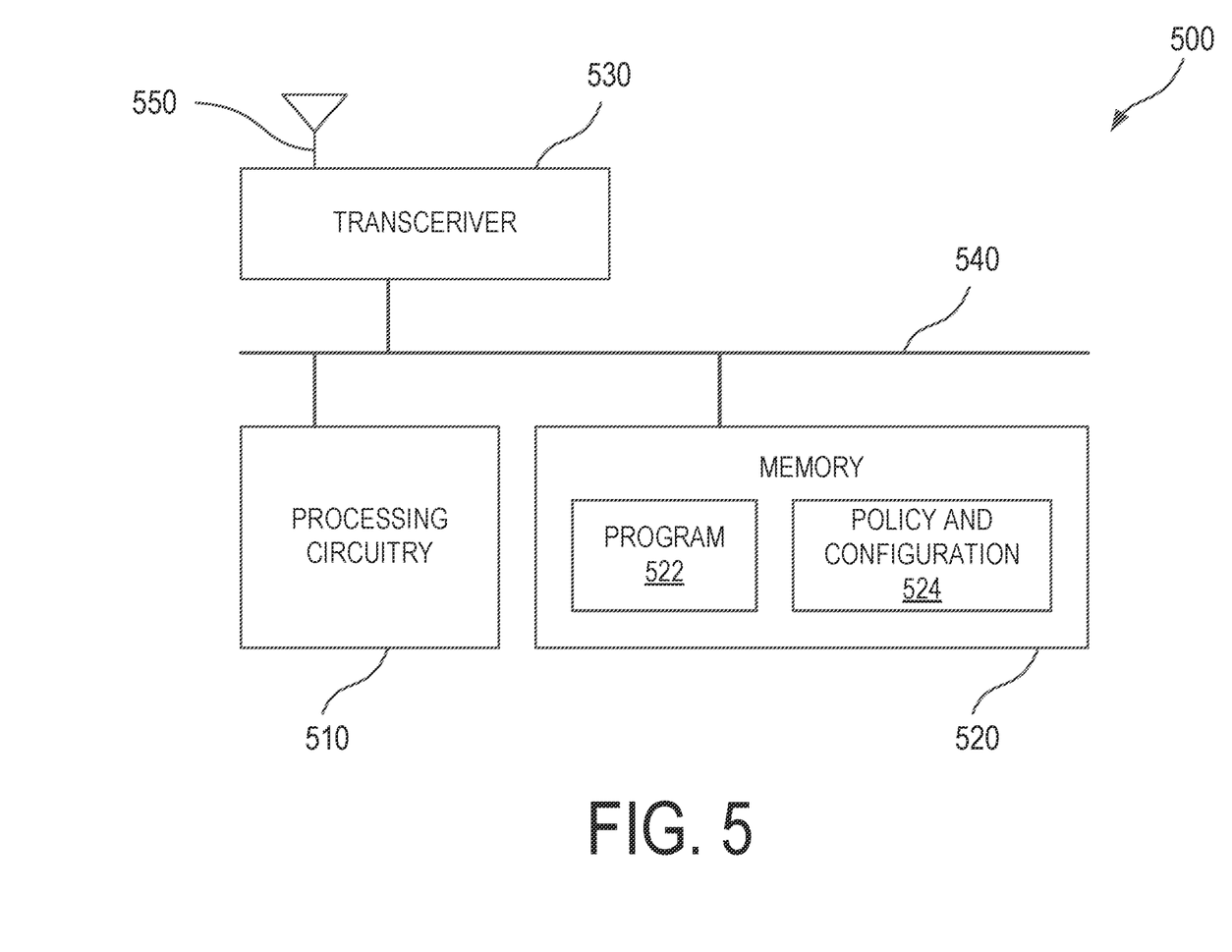
FIG. 5 shows a block diagram of a user equipment according to some embodiments of the disclosure.

FIG. 5 shows a block diagram of a UE (500) according to some embodiments of the disclosure. In some embodiments, one or more of the UEs (132, 134, 172, 174) can be implemented according to the UE (500). The UE (500) can be configured to perform various functions in accordance with one or more embodiments or examples described herein. Thus, the UE 500 can provide means for implementation of techniques, processes, functions, components, systems described herein.

The UE (500) can be a general purpose computer in some embodiments, and can be a device including specially designed circuits to implement various functions, components, or processes described herein in other embodiments. The UE (500) can include processing circuitry (510), a memory (520), a transceiver (530), and an antenna (540).

In various examples, the processing circuitry (510) can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry (510) can be a central processing unit (CPU) configured to execute program instructions to perform various functions and processes described herein. Accordingly, the memory (520) can be configured to store program instructions (522). The processing circuitry (510), when executing the program instructions (522), can perform the functions and processes. The memory (520) can further store the received set of configuration parameters (524) as well as other programs or data, such as operating systems, application programs, and the like. The memory can include one or more computer-readable storage mediums. The memory (520) can include a read only memory (ROM), a random access memory (RAM), a flash memory, a solid state memory, a hard disk drive, an optical disk drive, and the like.

The transceiver (530), or communication circuitry, is coupled with the processing circuitry (510) and receives and transmits radio frequency (RF) signals according to two or more available RATs via the antenna (540). The transceiver (530) can include a digital to analog convertor (DAC), an analog to digital converter (ADC), a frequency up convertor, a frequency down converter, filters, and amplifiers for reception and transmission operations. The transceiver (530) can include multi-antenna circuitry (e.g., analog signal phase/amplitude control units) for beamforming operations. The antenna (540) can include one or more antenna arrays.

The UE (500) can optionally include other components, such as input and output devices or other signal processing circuitry, and the like. Accordingly, the UE (500) may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include magnetic storage medium, optical storage medium, flash medium, and solid state storage medium.

When implemented in hardware, the hardware may comprise one or more of discrete components, an integrated circuit, an application-specific integrated circuit (ASIC), etc. While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of data transmission, comprising:
obtaining, by processing circuitry of a user equipment (UE), a set of configuration parameters that is received from a base station of a network, the set of configuration parameters indicating a plurality of radio access technologies (RATs) available for establishing a sidelink with another UE, the set of configuration parameters received from the base station including (i) corresponding quality of service (QoS) parameters for each of the plurality of RATs, and (ii) a plurality of spectrum segmentations defining spectrum resources of one or more RATs in each of plural geographic locations of the UE;

selecting a RAT for establishing the sidelink between the UE and the other UE from the plurality of RATs included in the set of configuration parameters received from the base station according to the QoS parameters and the plurality of spectrum segmentations of the plurality of RATs;

mapping service requirement information for the transmission of the service data from the UE to the other UE to communication parameters for the selected RAT; and transmitting, by transceiver circuitry of the UE, the service data from the UE to the other UE through the sidelink implemented by the selected RAT according to the communication parameters.

2. The method of claim 1, wherein the service requirement information is not RAT-specific.

3. The method of claim 1, wherein
the service requirement information of the service data includes one or more RAT-specific service requirements for respective one or more of the plurality of RATs.

4. The method of claim 1, wherein each of the plurality of spectrum segmentations is in association with a respective geographical location of the UE and a respective RAT.

5. The method of claim 1, wherein
the set of configuration parameters further includes user subscription information, user membership information, and service agreement information for establishing a primary link with one or more base stations.

6. The method of claim 1, wherein
the QoS parameters correspond to at least one of jitter, throughput, packet loss rate, availability of licensed or unlicensed spectrum, cost information, or whether an intelligent transportation system (ITS) spectrum is used.

7. The method of claim 1, wherein
the plurality of RATs includes at least two of a first RAT corresponding to a Long Term Evolution (LTE) standard, a second RAT corresponding to a fifth generation New Radio (5G NR) standard, and a third RAT corresponding to a Dedicated Short Range Communications (DSRC) standard.

8. The method of claim 1, wherein, before the mapping, further comprises:
determining whether a primary link between the UE and the base station is available;
in response to the primary link being available, determining whether the primary link is applied; and
in response to the primary link not being applied, determining the selected RAT from the plurality of RATs.

9. A user equipment (UE), comprising:
processing circuitry configured to:
obtain a set of configuration parameters that is received from a base station of a network, the set of configuration parameters indicating a plurality of radio access technologies (RATs) available for establishing a sidelink with another UE, the set of configuration parameters received from the base station including (i) corresponding quality of service (QoS) parameters for each of the plurality of RATs, and (ii) a plurality of spectrum segmentations defining spectrum resources of one or more RATs in each of plural geographic locations of the UE;
select a RAT for establishing the sidelink between the UE and the other UE from the plurality of RATs included in the set of configuration parameters received from the base station according to the QoS parameters and the plurality of spectrum segmentations of the plurality of RATs; and
map service requirement information for transmission of service data from the UE to the other UE to communication parameters for the selected RAT; and
transceiver circuitry configured to:
transmit the service data from the UE to the other UE through the sidelink implemented by the selected RAT according to the communication parameters.

10. The UE of claim 9, wherein the service requirement information is not RAT-specific.

11. The UE of claim 9, wherein
the service requirement information of the service data includes one or more RAT-specific service requirements for respective one or more of the plurality of RATs.

12. The UE of claim 9, wherein each of the plurality of spectrum segmentations is in association with a respective geographical location of the UE and a respective RAT.

13. The UE of claim 9, wherein
the set of configuration parameters further includes user subscription information, user membership information, and service agreement information for establishing a primary link with one or more base stations.

14. The UE of claim 9, wherein
the QoS parameters correspond to at least one of jitter, throughput, packet loss rate, availability of licensed or unlicensed spectrum, cost information, or whether an intelligent transportation system (ITS) spectrum is used.

15. The UE of claim 9, wherein
the plurality of RATs includes at least two of a first RAT corresponding to a Long Term Evolution (LTE) standard, a second RAT corresponding to a fifth generation New Radio (5G NR) standard, and a third RAT corresponding to a Dedicated Short Range Communications (DSRC) standard.

16. The UE of claim 9, wherein, before the mapping, the processing circuitry is further configured to:
determine whether a primary link between the UE and the base station is available;
in response to the primary link being available, determine whether the primary link is applied; and
in response to the primary link not being applied, determine the selected RAT from the plurality of RATs.

17. A non-transitory computer-readable medium storing instructions which when executed by a user equipment (UE) cause the UE to perform:
obtaining a set of configuration parameters that is received from a base station of a network, the set of configuration parameters indicating a plurality of radio access technologies (RATs) available for establishing a sidelink with another UE, the set of configuration parameters received from the base station including (i) corresponding quality of service (QoS) parameters for each of the plurality of RATs, and (ii) a plurality of spectrum segmentations defining spectrum resources of one or more RATs in each of plural geographic locations of the UE;
selecting a RAT for establishing the sidelink between the UE and the other UE from the plurality of RATs included in the set of configuration parameters received from the base station according to the QoS parameters and the plurality of spectrum segmentations of the plurality of RATs;

mapping service requirement information for transmission of service data from the UE to the other UE to communication parameters for the selected RAT; and transmitting the service data from the UE to the other UE through the sidelink implemented by the selected RAT according to the communication parameters.

18. The non-transitory computer-readable medium of claim 17, wherein the service requirement information is not RAT-specific.

19. The non-transitory computer-readable medium of claim 17, wherein the service requirement information of the service data includes one or more RAT-specific service requirements for respective one or more of the plurality of RATs.

20. The non-transitory computer-readable medium of claim 17, wherein, before the mapping, the instructions which when executed by the UE cause the UE to perform:

determining whether a primary link between the UE and the base station is available;

in response to the primary link being available, determining whether the primary link is applied; and in response to the primary link not being applied, determining the selected RAT from the plurality of RATs.

* * * * *